United States Patent
Parling (10) Patent No.: US 9,498,790 B2
(45) Date of Patent: Nov. 22, 2016

(54) APPARATUS FOR IMPREGNATION OF ITEMS WITH AN IMPREGNATING AGENT

(75) Inventor: Peter Parling, Herning (DK)

(73) Assignee: Imbox Shoecare A/S, EGAA (DK)

(*) Notice: Subject to any disclaimer, the term of this patent is extended or adjusted under 35 U.S.C. 154(b) by 985 days.

(21) Appl. No.: 12/988,022

(22) PCT Filed: Apr. 16, 2009

(86) PCT No.: PCT/DK2009/050088
§ 371 (c)(1),
(2), (4) Date: Dec. 15, 2010

(87) PCT Pub. No.: WO2009/127214
PCT Pub. Date: Oct. 22, 2009

(65) Prior Publication Data
US 2011/0091655 A1    Apr. 21, 2011

(30) Foreign Application Priority Data
Apr. 16, 2008 (DK) .................................. 2008 00557

(51) Int. Cl.
*B05B 15/12* (2006.01)
*C14C 15/00* (2006.01)
(Continued)

(52) U.S. Cl.
CPC ....... *B05B 15/1248* (2013.01); *B05B 15/1259* (2013.01); *B05B 15/1292* (2013.01);
(Continued)

(58) Field of Classification Search
CPC ............ B05C 11/1005; B05C 11/1002; B05C 11/1039; B05C 15/00; B05B 15/12; B05B 15/1225
(Continued)

(56) References Cited

U.S. PATENT DOCUMENTS 3,161,898 A * 12/1964 Bromfield et al. ............. 12/1 A
3,315,639 A *  4/1967 Close .................. B05B 15/1214
                                                      118/320
(Continued)

FOREIGN PATENT DOCUMENTS

DE    297 12 707 U1   12/1998
DE    199 45 229 A1    8/2000
(Continued)

*Primary Examiner* — Karl Kurple
(74) *Attorney, Agent, or Firm* — Fitch, Even, Tabin & Flannery LLP (57) ABSTRACT

A method and apparatus for surface treatment of footwear, bags, gloves, other leather items or leather-like items. The method includes optional covering a surface or a part of the items which are not to be treated; optional selecting time of operation of a spraying unit; placing items to be treated in a chamber; shutting the chamber and thereby manually or automatically initiating; activating the spraying unit for forming a mist of impregnating agent inside the chamber for applying impregnating agent onto the surfaces of the items; activating an air pump, ventilator or corresponding means for removal of excess impregnating agent from the chamber; and retaining excess impregnating agent in a filter which preferably is a filter containing activated carbon.

16 Claims, 8 Drawing Sheets

(51) Int. Cl.
  *B05C 13/02* (2006.01)
  *B05C 15/00* (2006.01)
  *B05B 15/04* (2006.01)

(52) U.S. Cl.
  CPC ......... *C14C 15/00* (2013.01); *B01D 2253/102* (2013.01); *B05B 15/045* (2013.01); *B05C 13/02* (2013.01); *B05C 15/00* (2013.01); *Y02P 70/36* (2015.11); *Y10S 55/46* (2013.01); *Y10S 118/07* (2013.01)

(58) Field of Classification Search
  USPC ............. 118/50, 326, 668, 677, 64, DIG. 7; 427/421.1, 427.1, 478, 475, 479–480, 427/96.7–96.9, 294, 350, 374.6, 398.4
  See application file for complete search history.

(56) References Cited

U.S. PATENT DOCUMENTS

| | | | | |
|---|---|---|---|---|
| 3,401,052 A * | 9/1968 | Berger et al. | | 427/242 |
| 3,410,619 A * | 11/1968 | Delnay | | B25J 21/02 312/1 |
| 3,496,856 A * | 2/1970 | Wiggins | | B05B 15/1214 454/50 |
| 3,547,683 A * | 12/1970 | Hayes et al. | | 427/497 |
| 4,378,728 A * | 4/1983 | Berkmann | | B05B 15/1229 118/326 |
| 4,391,602 A * | 7/1983 | Stichnoth et al. | | 8/149.1 |
| 4,519,222 A * | 5/1985 | Kannegiesser et al. | | 68/5 C |
| 4,662,309 A * | 5/1987 | Mulder | | 118/312 |
| 4,704,298 A * | 11/1987 | Herman et al. | | 427/453 |
| 4,761,305 A * | 8/1988 | Ochiai | | 427/180 |
| 4,762,578 A * | 8/1988 | Burgin et al. | | 156/64 |
| 4,928,624 A * | 5/1990 | Overton, Jr. | | 118/308 |
| 4,957,058 A * | 9/1990 | Boguslavsky et al. | | 118/323 |
| 4,975,305 A * | 12/1990 | Biginelli | | 427/354 |
| 5,110,615 A * | 5/1992 | Maiorca et al. | | 427/8 |
| 5,162,132 A * | 11/1992 | Diaz | | B05B 15/1214 118/326 |
| 5,187,955 A * | 2/1993 | Hertig et al. | | 68/58 |
| 5,320,873 A * | 6/1994 | McClain et al. | | 427/393.2 |
| 5,461,742 A * | 10/1995 | Pasad et al. | | 8/149.2 |
| 5,462,601 A * | 10/1995 | Falcoff | | B05B 13/0221 118/313 |
| 5,480,485 A * | 1/1996 | McClain et al. | | 118/64 |
| 5,482,745 A * | 1/1996 | Cuellar et al. | | 427/345 |
| 5,505,777 A * | 4/1996 | Ciardella et al. | | 118/663 |
| 5,533,799 A * | 7/1996 | Nickolaus, Jr. | | 312/249.12 |
| 5,884,418 A * | 3/1999 | McNally | | 34/389 |
| 5,891,201 A * | 4/1999 | Enderlin et al. | | 8/549 |
| 5,983,678 A * | 11/1999 | Enderlin et al. | | 68/10 |
| 6,045,864 A * | 4/2000 | Lyons et al. | | 427/255.23 |
| 6,050,314 A * | 4/2000 | Kakishima et al. | | 156/356 |
| 6,134,924 A * | 10/2000 | Enderlin et al. | | 68/10 |
| 6,189,346 B1* | 2/2001 | Chen et al. | | 68/5 R |
| 6,195,165 B1* | 2/2001 | Sayegh | | 356/613 |
| 6,245,150 B1* | 6/2001 | Lyons et al. | | 118/726 |
| 6,245,392 B1* | 6/2001 | Hillenbrand | | 427/498 |
| 6,284,173 B1* | 9/2001 | Austin | | B29C 39/10 257/E21.504 |
| 6,391,378 B1* | 5/2002 | Carr et al. | | 427/8 |
| 6,468,350 B1* | 10/2002 | Hillenbrand | | 118/620 |
| 6,711,466 B2* | 3/2004 | Abraham et al. | | 700/240 |
| 6,715,692 B2* | 4/2004 | Peterson et al. | | 239/8 |
| 6,887,293 B1* | 5/2005 | Abad | | B05B 15/1248 427/378 |
| 7,060,106 B2* | 6/2006 | Kleker | | 8/149.1 |
| 7,235,109 B2* | 6/2007 | Kleker | | 8/149.3 |
| 7,779,779 B2* | 8/2010 | Ferguson | | B05B 15/1207 118/326 |
| 8,037,626 B2* | 10/2011 | Moon et al. | | 38/14 |
| 8,721,753 B2* | 5/2014 | Ayshford | | B01D 46/0058 55/385.1 |
| 2005/0095366 A1* | 5/2005 | Fang et al. | | 427/421.1 |
| 2005/0160974 A1* | 7/2005 | Ivanov et al. | | 118/50 |
| 2006/0024212 A1* | 2/2006 | Hwang | | B01L 9/02 422/400 |
| 2006/0130752 A1* | 6/2006 | McLaughlin | | 118/313 |
| 2006/0213432 A1* | 9/2006 | Lotterhos | | B05B 15/12 118/31.5 |
| 2008/0003349 A1* | 1/2008 | Van Sciver et al. | | 427/8 |
| 2008/0156667 A1* | 7/2008 | Huggins | | 206/1.8 |
| 2009/0304940 A1* | 12/2009 | Heldt et al. | | 427/427.2 |
| 2010/0001097 A1* | 1/2010 | Spivak | | A61M 35/00 239/207 |
| 2010/0101489 A1* | 4/2010 | Wurster | | 118/326 |
| 2010/0162951 A1* | 7/2010 | Pinotti | | A61K 8/35 118/642 |
| 2011/0059245 A1* | 3/2011 | Miyamoto et al. | | 427/345 |
| 2011/0059246 A1* | 3/2011 | Miyamoto et al. | | 427/345 |
| 2011/0162576 A1* | 7/2011 | Schaefer | | 118/58 |
| 2012/0304924 A1* | 12/2012 | Fernholz et al. | | 118/500 |
| 2013/0133570 A1* | 5/2013 | Huang | | C23C 14/564 118/50 |
| 2016/0037865 A1* | 2/2016 | Marker | | A43B 7/12 427/553 |

FOREIGN PATENT DOCUMENTS

| | | |
|---|---|---|
| EP | 1 332 802 A2 | 8/2003 |
| EP | 1 586 362 A2 | 10/2005 |
| ES | 2 005 932 | 4/1989 |
| ES | 2 014 544 | 7/1990 |
| FR | 2 666 522 | 3/1992 |
| GB | 379785 | 9/1932 |
| GB | 406348 | 2/1934 |
| GB | 2 125 319 A | 3/1984 |
| JP | 7-275589 A | 10/1995 |

* cited by examiner

APPARATUS FOR IMPREGNATION OF ITEMS WITH AN IMPREGNATING AGENT

BACKGROUND OF THE INVENTION

1. Field of the Invention

The present invention concerns a method for impregnating items, for example footwear, bags, gloves, other leather items or leather-like items. The invention also concerns an apparatus for performing the method according to the invention.

2. Description of the Prior Art

When buying footwear and other leather items it has almost become common also to buy a spray can with a suitable impregnating agent. In the purchasing situation, it is not always remembered if a corresponding impregnating agent is already present at home, often resulting in a wrong purchase such that in many homes a number of spray cans with greater or lesser content of impregnating agent accumulate.

Storing of spray cans with impregnating contents may in practice imply a serious environmental problem because the spray cans cannot be discarded together with refuse collection and require handing in to recycling stations.

Moreover, the use of spray cans with impregnating agent or, for that matter, other contents is an unfavourable environmental factor due to the propellant being released to the atmosphere through the use thereof.

Thus it is expected that within a measurable time, a ban will be imposed on the use of spray cans containing a mixture of harmful propellant and inter alia impregnating agents.

SUMMARY OF THE INVENTION

The invention is a method and an apparatus which by means of simple technical measures enables elimination of the above mentioned drawbacks by surface treatment or impregnation of the items mentioned in the introduction, such as footwear.

A method for surface treatment of footwear, bags, gloves, other leather items or leather-like items comprises the following method steps:

possible covering a surface or a part of items not to be treated;

possible selecting time of operation of a spraying unit;

placing items to be treated in a chamber;

shutting the chamber and thereby manually or automatically initiating the following further method steps;

activating the spraying unit for forming a mist of impregnating agent inside the chamber for applying the impregnating agent onto surfaces of the items;

activating an air pump, ventilator or corresponding means for removal of excess impregnating agent from the chamber; and retaining excess impregnating agent in a filter, which is preferably a filter containing activated carbon.

In a simple way and by means of simple technical measures it hereby becomes possible to eliminate the above-mentioned drawbacks that otherwise occur in connection with surface treatment by impregnation of footwear and other leather items.

As an alternative to the usual home impregnation of footwear, according to the invention it is possible already, for example, in a shoe shop to provide an optimal surface treatment of spraying footwear with a specific impregnation agent.

According to the invention the method may comprise the following further process steps:

selecting an impregnating agent; and adjusting nozzles of the spraying unit in dependence on size and shape of actual items.

With the object of also treating items that cannot stand in the chamber by themselves, the method according to the invention may advantageously include the following additional method steps:

suspending items to be surface treated and which cannot stand by themselves in the chamber; and/or supporting items with substantial height, such as boots, in upright position, for example, by means of internal supports in the bootlegs.

The invention also concerns an apparatus for impregnating items, comprising a closed chamber, at least one storage container for specific impregnating agents, the at least one storage container being connected with an electric pump via a valve system comprising at least one valve, wherein the pump is connected with at least one atomizing nozzle in the chamber, an electronic control unit for activating the pump and the valve system for connecting the pump and valve system with a storage container containing a specific impregnating agent, a filter and an air pump, ventilator or corresponding means for establishing a vacuum in the chamber for removal of residual impregnating agent from the chamber by retaining the residue in the filter.

For optimizing the surface treatment and minimizing use of impregnating agent, the apparatus according to the invention includes a scanner, a camera or other means for determining the shape and size of items disposed in the chamber and which, coordinated by the control, activates specific atomizing nozzles.

The apparatus according to the invention moreover includes means for supporting elongated items, by way of example high boots, either upright or hanging in the chamber.

Advantageously, the apparatus according to the invention may includes a drawer arranged under the chamber. The drawer is preferably accessible from the front side of the apparatus and contains the filter and optionally also the storage containers for impregnating agents.

To facilitate access from the spraying chamber, the chamber may include a sliding door which opens upwardly and preferably includes an electrical actuating mechanism.

DESCRIPTION OF THE DRAWINGS

The invention is now explained in detail in connection with the drawing, in which.

DETAILED DESCRIPTION OF THE INVENTION

The apparatus 2 shown in FIGS. 1-6 is designed as a generally box-shaped cabinet 4 with a front door in the form of a sliding door 6 (FIG. 3) and with a lower drawer 8 with a front 10. The cabinet 4 includes an internal spraying chamber 12 with a plane bottom plate 14 upon which items to be surface treated can be supported.

Figure 1:
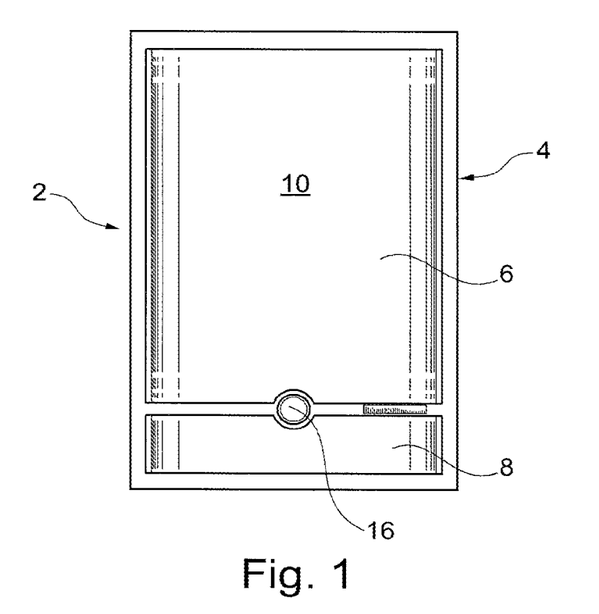
FIG. 1 shows a plan view of an embodiment of an apparatus according to the invention, as seen from the front side thereof.
Figure 2:
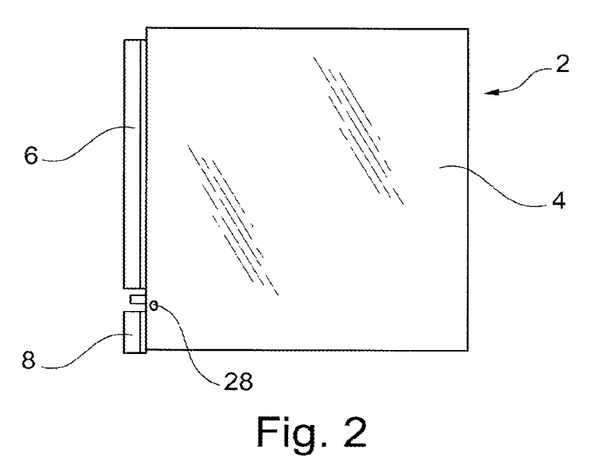
FIG. 2 shows a plan view of the apparatus of FIG. 1 which is seen from the right side.
Figure 3:
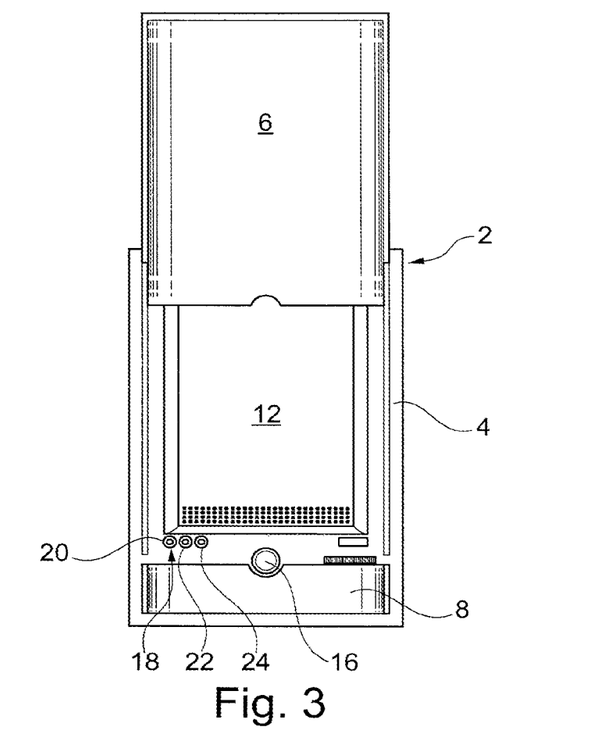
FIG. 3 shows a plan view of the apparatus of FIG. 1 which is seen from the front and with the chamber being open.

When the sliding door 6 is opened, as shown in FIG. 3, by an operating button 16, a display 18, which by way of example has three pushbuttons 20, 22 and 24 becomes accessible for selecting a specific impregnating agent.

After preselection by pressing one of the pushbuttons 20, 22 and 24, the sliding door 6 is closed and the apparatus 2 is started by renewed pressing on the operating button 16. That is, the impregnation treatment is initiated as soon as the sliding door 6 has been closed. During operation of the apparatus 2, the operating button 16 will preferably be illuminated and inactive. It is to be inoperative for pressure action.

Figure 4:
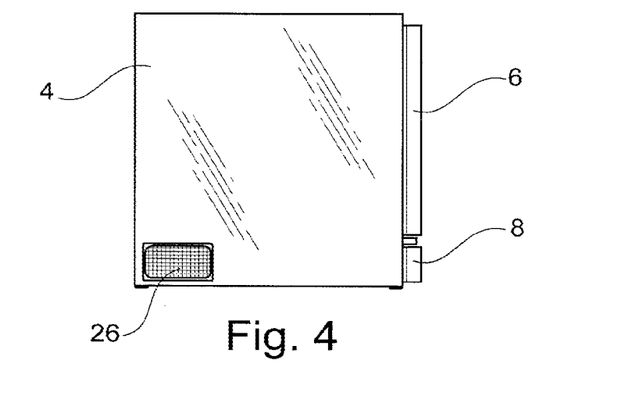
FIG. 4 shows a plan view of the apparatus of FIG. 1 which is seen from the left side.
Figure 5:
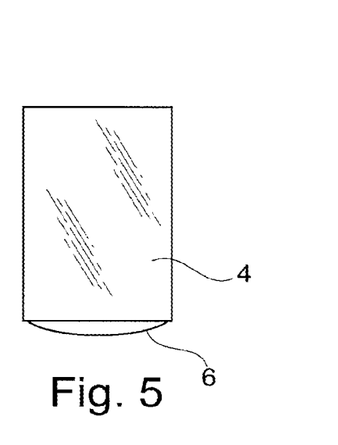
FIG. 5 shows a plan view of the apparatus of FIG. 1 which is seen from above.
Figure 6:
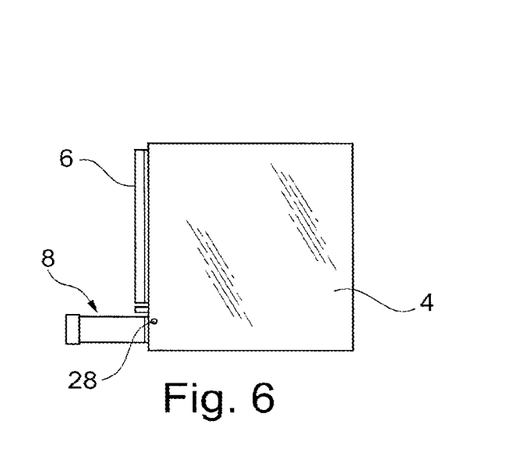
FIG. 6 shows a plan view of the apparatus of FIG. 2 which is shown with an open drawer.

At the end of impregnation treatment, the time period of which can be fixedly pre-selected or adjustable, an air pump, ventilator or similar means integrated in the bottom of the cabinet 4, which is preferably behind the drawer 8, will automatically started and establishes a vacuum in the spraying chamber 12 causing the residual impregnating agent to be exhausted through a filter, which preferably contains activated carbon, that is, by way of example, incorporated in the drawer 8. The drawer 4 preferably has less depth than the depth of the cabinet 4, which appears from FIGS. 4 and 6. FIG. 4 further shows an exhaust opening 26 of the air pump, ventilator or the like disposed behind the drawer 8.

Figure 8:
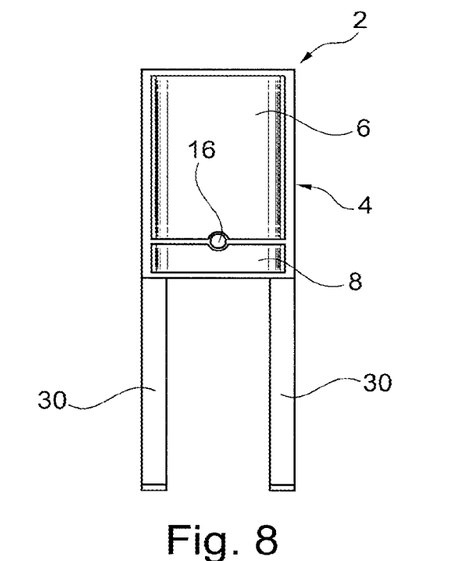
FIG. 8 shows a plan view of the apparatus of FIG. 1 which is provided with legs.
Figure 9:
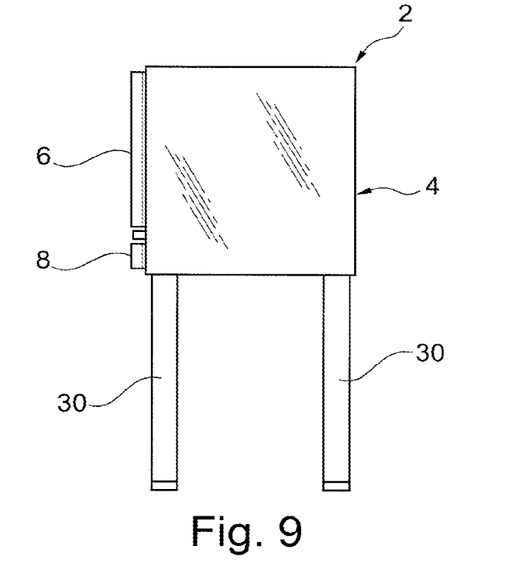
FIG. 9 shows a plan view of the apparatus of FIG. 2 which is provided with legs.
Figure 10:
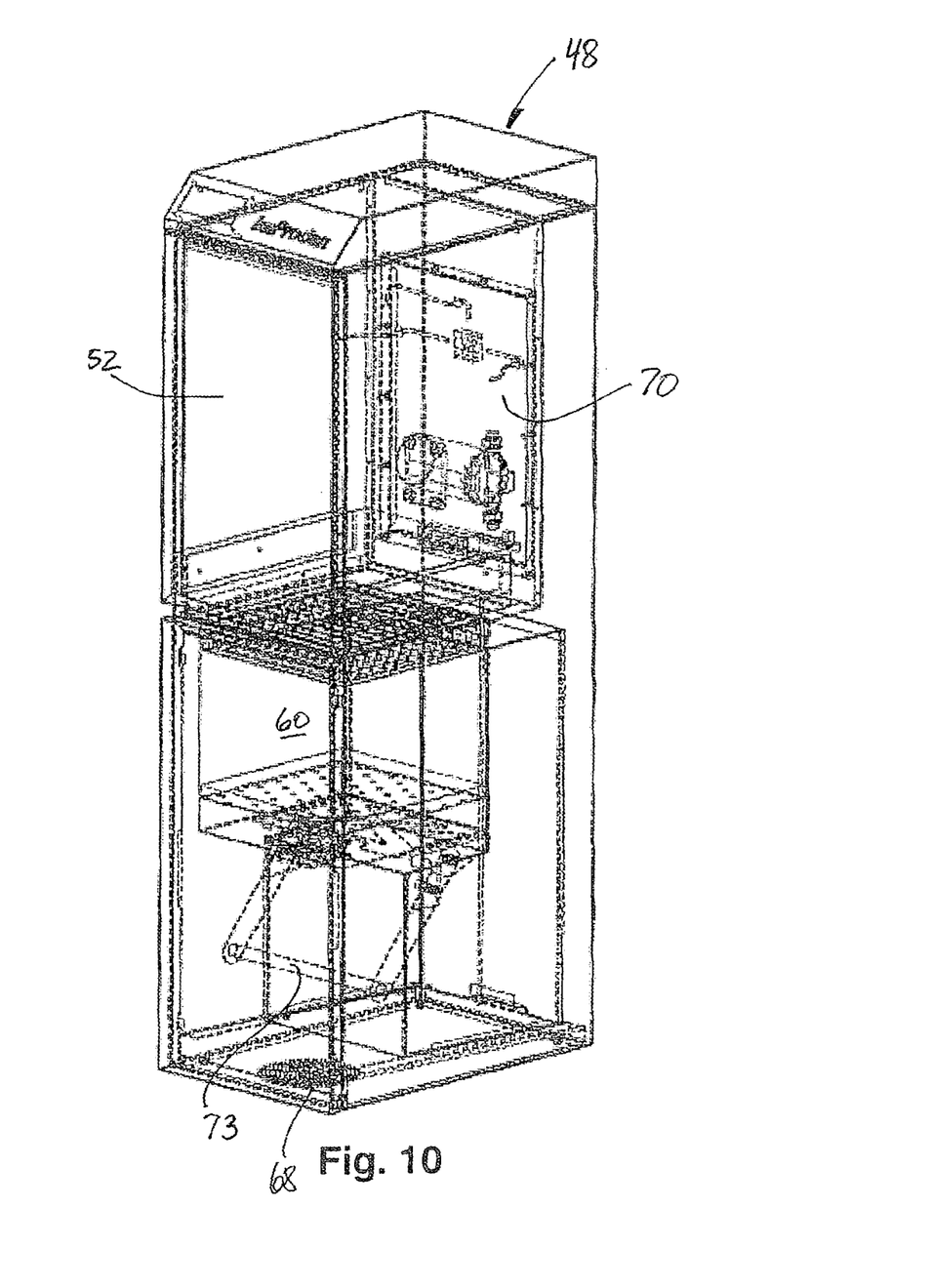
FIG. 10 shows a perspective "transparent" view of a preferred embodiment of an apparatus according to the invention which is seen obliquely from behind.

The drawer 8 may, as indicated, also have space for, by way of example, three storage containers for impregnating agent. As shown additionally in FIGS. 2, 6 and 8, the drawer 8 is provided with a key operated lock 28 as the drawer 8 is normally only to be opened by certified personnel. FIGS. 8 and 9 show the apparatus 2 provided with legs 30 so that the cabinet 4 is located at a working level which is comfortable for staff.

Figure 7:
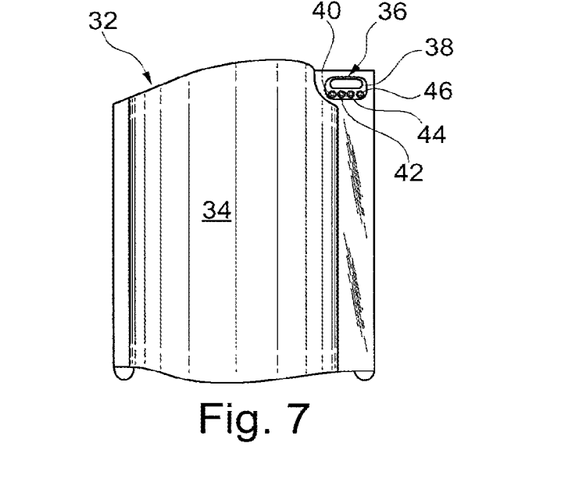
FIG. 7 shows a plan view of a second embodiment of an apparatus according to the invention which is seen from the front side thereof.

FIG. 7 shows an alternative embodiment of an apparatus 32 which includes a left-hinged pivoting door 34 and a display 36 having an associated operating panel 38 with pushbuttons 42, 44 and 46.

Figure 11:
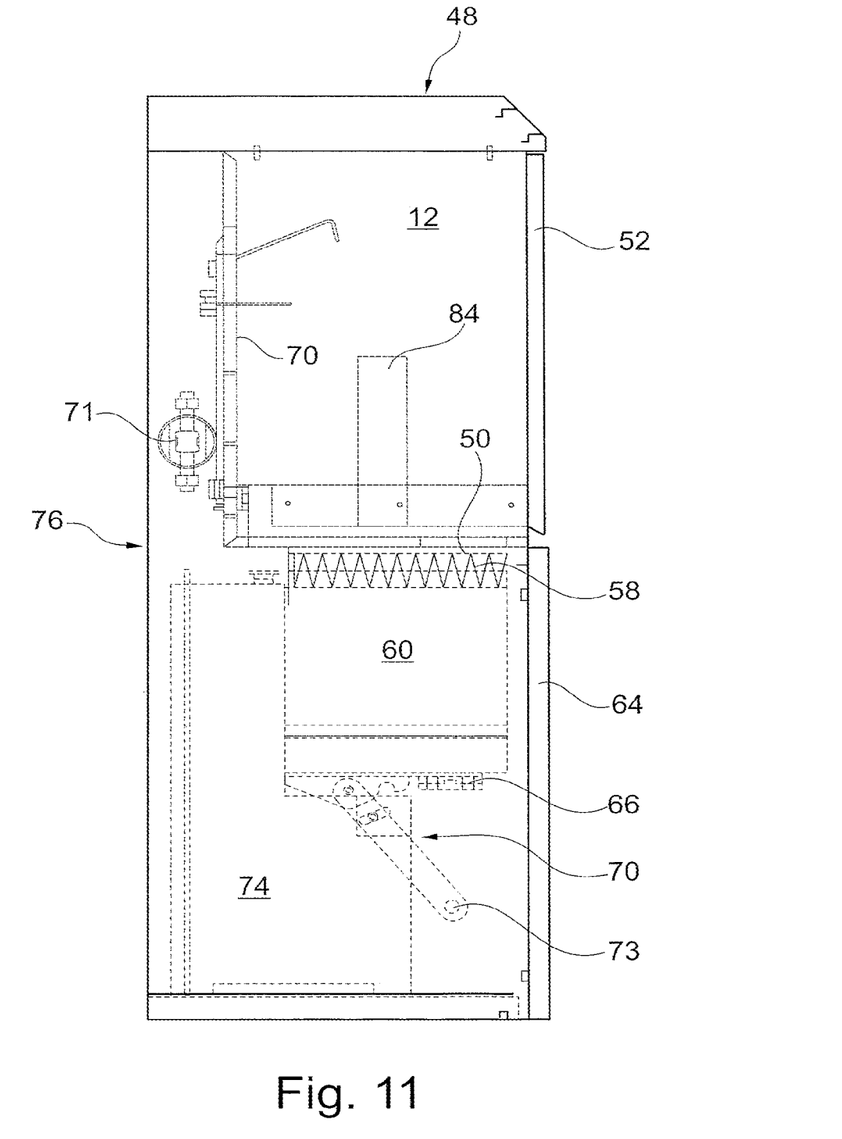
FIG. 11 shows a plan view of the apparatus of FIG. 10 which is seen from the side.
Figure 12:
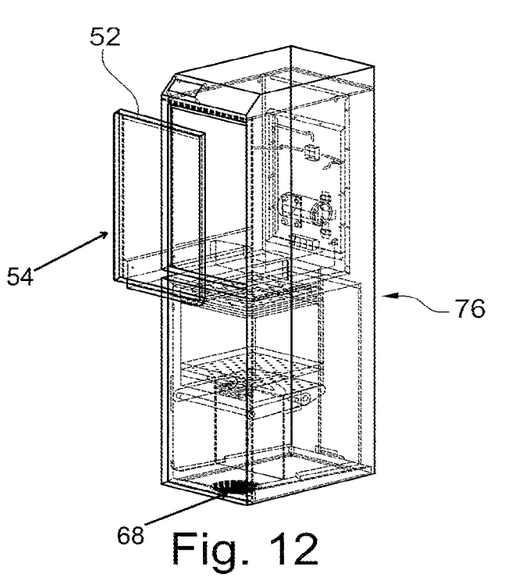
FIG. 12 shows a perspective view corresponding to FIG. 10 which is shown with an upper drawer in the open position for inserting items to be impregnated.
Figure 13:
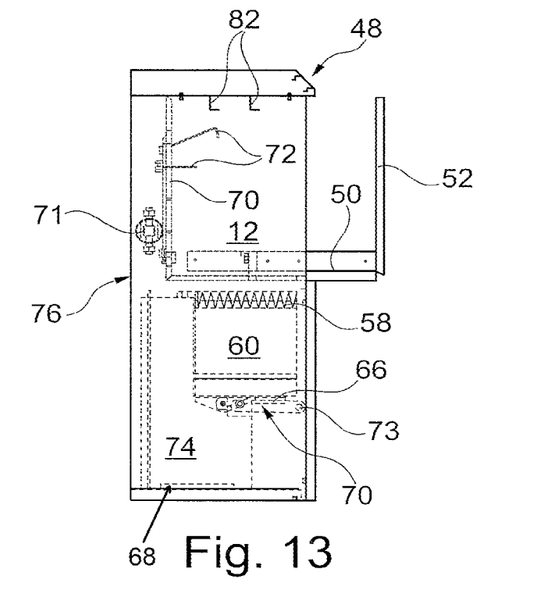
FIG. 13 shows a plan view corresponding to FIG. 12.
Figure 14:
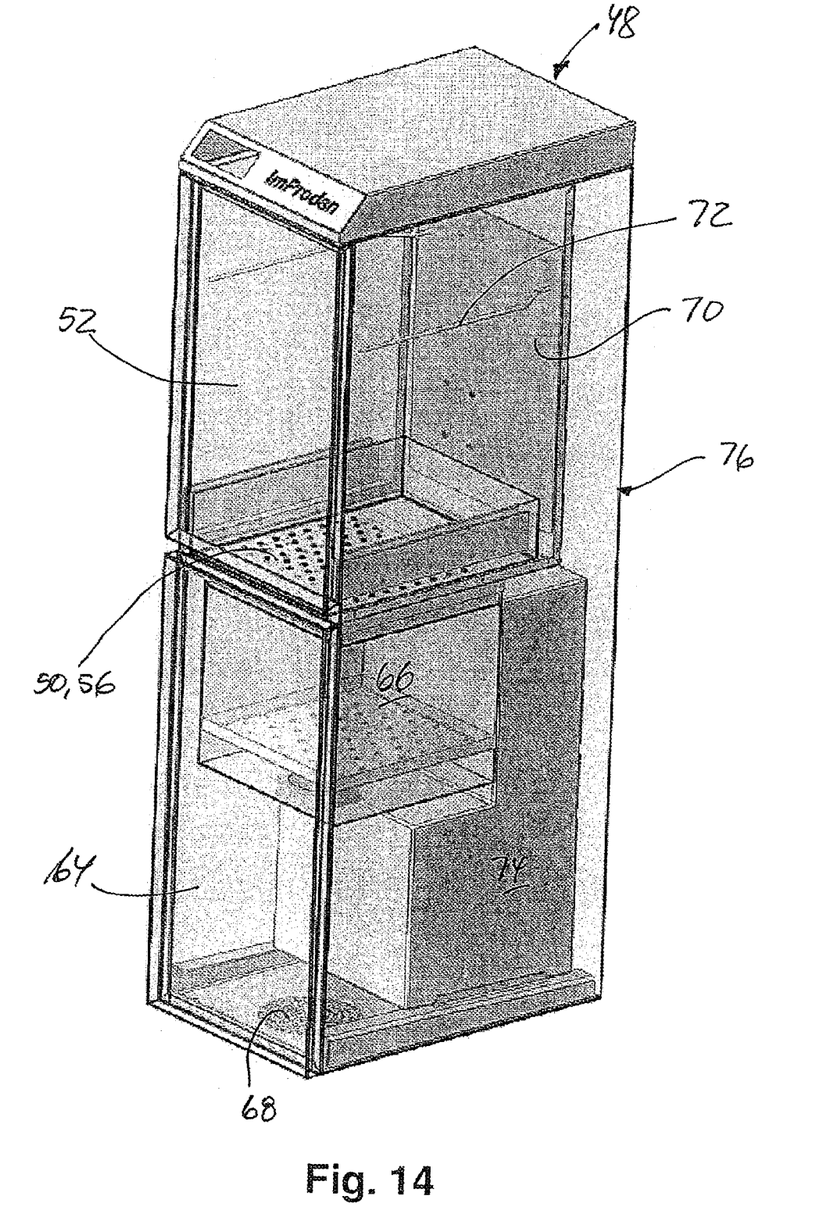
FIG. 14 shows a simplified perspective view of the preferred apparatus according to the invention shown in FIGS. 10-13.

FIGS. 10-14 show a preferred embodiment of an apparatus 48 where a bottom plate 50 and an upper front door 52 of the spraying chamber 12 a sliding drawer 54 which, as shown in FIGS. 12 and 13, can be drawn out for making space for lateral insertion of items in the spraying chamber 12. The bottom plate 50 is made of a perforated plate 56 which is a form connection via an upper pleated drop filter 58 for a cubic filter cassette 60 preferably filled with activated carbon. The drop filter with 58 is disposed immediately under the spraying chamber 12 in a compartment 62 having access through a lower front door 64.

In the compartment 64 immediately under the filter box 60, a vacuum source which may be an air pump or ventilator 66 is placed, providing exhaust of excess impregnating liquid through the filter cassette 60. The vacuum source communicates with the surroundings through a lower ventilation opening 68 at the bottom of the apparatus 48.

When the filter cassette 60 containing the upper drop filter 58, after impregnating about 6,600 pairs of shoes and consuming 37-42 liters of impregnation liquid, is to be replaced, the lower front door 64 is opened, after which the filter cassette 60 is removal by downward movement by a pivot arm mechanism 70 via a transverse operating handle 73, such that the used filter cassette 60 can be removed and replaced by a corresponding new filter cassette 60.

In FIG. 11, the handle 73 is turned down from the position in FIG. 13 which releases, the filter cassette 60 from contact with the bottom plate 50 to provide a spacing between the filter cassette 60 and the bottom plate 50 to permit removal of the filter cassette 60. The filter cassette 60 in FIG. 13 is shown in its upper operational situation when the filter cassette 60 contacts the bottom plate 50 to provide a connection between the bottom plate and the filter cassette.

With the object of protecting or facilitating cleaning the inner walls and the bottom plate 50 of the spraying chamber 12, advantageously there may be applied an internal covering of a reticulated polyurethane foam with a PPI (pore per inch) of about 70-80, by way of example of the type Regicell 80 HIFI Black which has a density of about 30 kg/m$^3$.

The covering of the bottom plate 50 only influences the air penetration of the perforated bottom plate 50 (FIG. 14) to a very small degree. Under normal operational conditions, the internal covering is to be replaced more often than the filter cassette 60 which, by way of example, is about every 2,000 impregnation treatments.

In a prototype version of the apparatus 48 according to the invention, the filter cassette 60 was made of MDF-board. For future filter cassettes 60, the cassette itself can be made of a considerably lighter material which, by way of example, is fiber cardboard. In that regard it is important to note that used filter cassettes 60 are completely harmless and may be disposed of together with refuse collection.

The applied impregnating liquid is particularly developed for impregnating shoes, gloves, clothing etc. The impregnating liquid is quick-drying and hardens in the course of about 90 seconds at 20° C. The impregnating liquid does not cause discoloration, spots or blotches. The impregnation liquid secures the fabric against bleaching by sunlight, attacks by fungus, mildew and fungus mould. The impregnation liquid can be used on oiled clothing of nylon/rayon and make it completely tight.

In the preferred embodiment of an apparatus 48 according to the invention shown in FIGS. 10-14, the apparatus is provided with a jacket 76 of stainless steel sheeting which in one piece constitutes the outer rear and side walls. With this configuration, there is only access to the interior of the apparatus through the upper and lower front doors 52 and 64.

At least one storage container of impregnating liquid is located in a lower L-shaped box 74 behind and under the filter cassette 60. A pump 71 and diverse supply connections are located behind a stationary rear sheet 70 of the spraying chamber 12 from which atomizing nozzles 72 protrude into the spraying chamber 12.

The processing time is about 25 seconds in total to complete treatment of an item. The atomization treatment for coating an item takes 800 milliseconds with about 20 seconds being used for drying the treated item. The ventilator 66 has a capacity of about 100 m³/h and the exhaust from the spraying chamber 12 provides a complete air exchange of 1.5 seconds. The interval between treatments is about 4 seconds.

The specific arrangement of the spraying chamber 12 may vary according to need, depending on the actual items to be impregnated by means of the apparatus 2, 32 and 48.

For example, the spraying chamber 12 may be equipped with a number of atomizing nozzles that have a mutually fixed disposition, or the mutual disposition of which may be varied. Another possibility is equipping the spraying chamber 12 with movable atomizing nozzles if the actual pattern of movement is determined by the actual shape and size of the actual item to be impregnated. FIG. 11 illustrates a camera, a scanner or other means 84 for determining the shape and size of items disposed in the chamber.

As also indicated, the spraying chamber 12 may be equipped with devices or means 82 as shown in FIG. 13 for suspending or in other ways reinforcing items that either cannot stand by them selves or which have substantial height, such as high boots.

A very significant future application of the method and apparatus according to the invention is for impregnating treatment of clothing, particularly hunting clothes, leisure clothing, ski clothing, children's clothing, including snow-suits for children.

In the performing of the present invention, additional future applications are expected, such as antiseptic treatment of bowling shoes (shoes for rent or lending) and antiseptic treatment of summer footwear, in particular sandals.

The present invention is may be used such that the method and apparatus according to the invention are primarily used in specialty stores for footwear and leather items. Apparatuses are set up according to a co-operation agreement (franchise) and serviced by a firm that owns and sets up the apparatuses (impregnation machines). In other words, the individual user or business preferably pays a fixed fee determined by a set number of treatments and possibly by the type of treatment, as it is presumably to be more expensive for treating a pair of high boots than a pair of shoes.

The apparatus of the invention has an external counter or a display which is read in connection with payment, and which according to prior art by way of example can be remotely read. Alternatively, the apparatus can be adapted to communicate with a service firm via SMS or other wireless communication to provide remote controlled reading.

When buying footwear or other leather items, that normally are to be impregnated afterwards with use of the invention, it should be a standard situation that the shop assistant in connection with a purchase will ask, "should I impregnate the shoes", "should I impregnate the boots" or "should I impregnate the bag?"

Finally, it is to be noted that an impregnating apparatus of the invention may be used as in a slot-machine version for setup in hotels, shopping centers, train and bus stations or other public localities.

The invention claimed is:

1. A system for applying a surface treatment of at least one impregnating agent onto surfaces of items comprising footwear, gloves, clothing, bags and leather items, the system comprising:

a cabinet;

a stationary chamber contained within the cabinet, the chamber is closeable, is configured to hold the items and defines an internal spraying chamber including a plane bottom plate and a first door located at an upper front portion of the cabinet which provides access through which the items which are to be treated with the at least one impregnating agent are inserted into the internal spraying chamber to be sprayed with the at least one impregnating agent;

means for establishing a vacuum inside the internal spraying chamber which is located under the internal spraying chamber for exhausting any residual of the at least one impregnating agent from the internal spraying chamber;

a filter located within a compartment of the cabinet and arranged below a bottom of the internal spraying chamber, the means for establishing a vacuum being connected to a bottom of the filter and being configured so that any residual of the at least one impregnating agent is exhausted by the means for establishing the vacuum through the filter and any residual of the at least one impregnating agent is retained in the filter for disposal which is accessible for replacement through a second door in the compartment;

a box configured to store at least one storage container of the at least one impregnating agent which is located in the compartment;

an electric pump in the cabinet;

at least one atomizing nozzle configured to spray the at least one impregnating agent for impregnating the items inside the internal spraying chamber and which is located on a side of a wall of the internal spraying chamber; and wherein, the electric pump is in fluid communication with the at least one atomizing nozzle configured to spray the at least one impregnating agent inside the internal spraying chamber to impregnate the items.

2. The self-contained apparatus according to claim 1, comprising:

a means for determining a shape and size of the items disposed in the chamber; and control means responsive to the determined shape for activating spraying of the impregnating agent by activating the at least one atomizing nozzle.

3. The apparatus according to claim 1, comprising:

means for supporting items in an upright or hanging position in the internal spraying chamber.

4. The apparatus according to claim 1, comprising:

a drawer disposed under the internal spraying chamber, which is accessible from a front side of the apparatus, for storing the at least one storage container of impregnating agent.

5. The apparatus according to claim 2, comprising:

a drawer disposed under the internal spraying chamber, which is accessible from a front side of the apparatus, for storing the at least one storage container of impregnating agent.

6. The apparatus according to claim 3, comprising:
a drawer disposed under the internal spraying chamber, which is accessible from a front side of the apparatus, for storing the at least one storage container of impregnating agent.

7. The apparatus according to claim 1, wherein the internal spraying chamber includes a sliding door for opening the internal spraying chamber and an electrical actuating mechanism of the sliding door.

8. The apparatus according to claim 2, wherein the internal spraying chamber includes a sliding door for opening the internal spraying chamber and an electrical actuating mechanism of the sliding door.

9. The apparatus according to claim 3, wherein the internal spraying chamber includes a sliding door for opening the internal spraying chamber and an electrical actuating mechanism of the sliding door.

10. The apparatus according to claim 5, wherein the internal spraying chamber includes a sliding door for opening the internal spraying chamber and an electrical actuating mechanism of the sliding door.

11. The apparatus according to claim 6, wherein the internal spraying chamber includes a sliding door for opening the internal spraying chamber and an electrical actuating mechanism of the sliding door.

12. The apparatus according to claim 1, comprising:
a drawer under the internal spraying chamber, which is accessible from a front side of the apparatus, for storing the filter.

13. The apparatus according to claim 3, comprising:
a drawer under the internal spraying chamber, which is accessible from a front side of the apparatus, for storing the filter.

14. The apparatus according to claim 5, comprising:
a drawer under the internal spraying chamber, which is accessible from a front side of the apparatus, for storing the filter.

15. The apparatus according to claim 7, comprising:
a drawer under the internal spraying chamber, which is accessible from a front side of the apparatus, for storing the filter.

16. The apparatus according to claim 1, comprising:
an electronic control unit which controls the means for establishing a vacuum and a means for starting the means for establishing a vacuum in the internal spraying chamber at the end of an impregnation treatment for removing residual impregnating agent.

* * * * *